United States Patent [19]
Dings et al.

[11] Patent Number: 5,680,809
[45] Date of Patent: Oct. 28, 1997

[54] DEVICE FOR BREWING COFFEE, TEA OR SIMILAR DRINKS

[75] Inventors: René Cornelis Antonius J. Dings, Den Hoorn; Lucas Alphonsus Maria Evers, Bunnik; Siebe Schootstra, Culemborg, all of Netherlands

[73] Assignee: Koninklijke Olland Groep B.V., Netherlands

[21] Appl. No.: 696,688

[22] Filed: Aug. 14, 1996

[30] Foreign Application Priority Data

Aug. 22, 1995 [NL] Netherlands ............. 1001025

[51] Int. Cl.$^6$ ........................................ A47J 31/34
[52] U.S. Cl. ............................ 99/289 D; 99/289 R
[58] Field of Search .................. 99/289 D, 289 R, 99/289 T, 289 P, 302 R, 302 P

[56] References Cited

U.S. PATENT DOCUMENTS 1,804,795  5/1931  Lee .

FOREIGN PATENT DOCUMENTS

| 1 002 711 | 3/1952 | France . |
| 1 118 772 | 6/1956 | France . |
| 1 205 553 | 2/1960 | France . |
| 2 495 924 | 6/1982 | France . |
| 510478 | 1/1955 | Italy ...................... 99/289 D |

*Primary Examiner*—Reginald Alexander
*Attorney, Agent, or Firm*—Kilpatrick Stockton LLP; Michael D. Bednarek

[57] ABSTRACT

A device for brewing coffee, tea and the like. A rotor with three circumferentially spaced cells is mounted for a stepwise rotary movement within a cylindrical housing to move each of the cells successively to each of three circumferentially spread locations, where an ingredient's inlet, a filter and a discharge opening for dregs respectively are provided. A source of pressurized air is provided at a location within a transitional area between the ingredient's inlet location and the filter location so as to be active as an agitation means in the filling and extracting phase and as a means for expelling the extract in the filter phase.

5 Claims, 2 Drawing Sheets

DEVICE FOR BREWING COFFEE, TEA OR SIMILAR DRINKS

BACKGROUND OF THE INVENTION

This invention relates to the field of preparing drinks in drinks vending machines. More particularly the invention relates to a device for brewing coffee, tea and the like.

In a well-known coffee maker use is made of a vertically positioned cylindrical container, the upper end wall of which is formed as a piston and the lower end wall or bottom of which is formed as a filter. The inlet for (hot) water and for the ingredients to be extracted opens into the circumferentially closed cylindrical wall at a level just below the upper piston position of the upper end wall. The bottom wall functioning as a filter is vertically movable between an upper filtering position in which it closes the container at its lower end and a lower or expelling position in which it leaves an open space under the lower edge of the container. In the latter position the dregs collected on the filter at the end of an extraction and filtration step may be removed from the filtration bottom by means of a slide provided laterally of the container at the level of the bottom wall in said lower position.

With such a device the preparation of each following drink unit may start only after the entire cycle of the preparation of the foregoing drink unit is completed, i.e. only after the means for expelling the extract and the means for removing the dregs resulting from the foregoing drink unit and collected on the filter have returned into the starting positions. This means a.o. that with such a coffee brewing device the preparation of a pot containing twelve cups of coffee will often take more than six minutes.

French patent specifications 1,002,711 and 1,118,772 discloses a coffee brewing device of a different type, comprising a substantially cylindrical container, an inlet for ingredients, a filter and an opening for discharging dregs collecting on said filter, said inlet, said filter and said opening being provided at three circumferentially spaced locations of the wall of said container, a rotor with three circumferentially spread cells being mounted within said container for a stepwise movement successively to each of said three circumferential spread locations, means being provided for expelling extract through said filter outwardly.

With this device the coffee extract is expelled by means of the liquid component (hot water) that it supplied from the center of the rotor into the cell at the filtering location and pressed through the dry component(s) and the filter outwardly. Thus the supply of the liquid component (hot water) and the start of the extracting process are postponed until reaching the filtering stage, wherein the extracting step is taking place while the water is pressed through the dry component (e.g. coffee powder).

Dutch patent application 8500925 discloses a coffee machine, in which the expelling of the coffee extract through the filter is effected by producing an under pressure in a discharge space under the filter. Furthermore Dutch patent application 8901968 discloses a coffee brewing device in which pressurized air is passed from a space under a filter and via said filter through the ingredients being extracted as a means for agitating during the extracting process.

SUMMARY OF THE INVENTION

It is an object of the invention to provide an improved device for preparing drinks, more particularly for brewing coffee, tea and the like.

A particular object of the invention is to provide a drink (coffee) brewing machine designed for an intensified extracting process while still enabling the preparation of a plurality of drink units one after the other in a relatively short time.

Accordingly the invention provides a device for brewing coffee, tea or similar drinks, of the type comprising a substantially cylindrical container, an inlet for dry and liquid ingredients, a filter and an opening for discharging dregs collecting on said filter, said inlet, said filter and said opening being provided at three circumferentially spaced locations of the wall of said container, a rotor with three circumferentially spread cells being mounted within said container for a stepwise movement to each of said three circumferential spread locations, means being provided for expelling extract through said filter outwardly, said being constituted by a source of pressurized gas, a supply conduit from said source opening into the container wall at that side, along which the stepwise movement of the rotor is directed from the ingredients inlet towards the filter, and at a location within a transitional area between a filling position, in which the ingredients are supplied, and a filtering position, in which the filtering of the extract is taking place.

With a device thus formed a cell filled with all of the required ingredients at a first position will, upon completion of the extracting process within said cell, be turned to the next position within the area of the filter to expel the extract through said filter outwardly. At the same time the next cell, as seen in the direction of rotation, will enter the area of the ingredients inlet so as to be filled with ingredients and to start the extracting process within said next cell already, while the extract from the foregoing cell is still being expelled through the filter and the dregs thereby collecting on the filter in said foregoing cell will be discharged after a further rotary step. In this manner the total time required for preparing a plurality of drink units may be substantially reduced.

The invention will be hereinafter further explained by way of example with reference to the diagrammatic drawings.

DETAILED DESCRIPTION OF THE INVENTION

Figure 1:
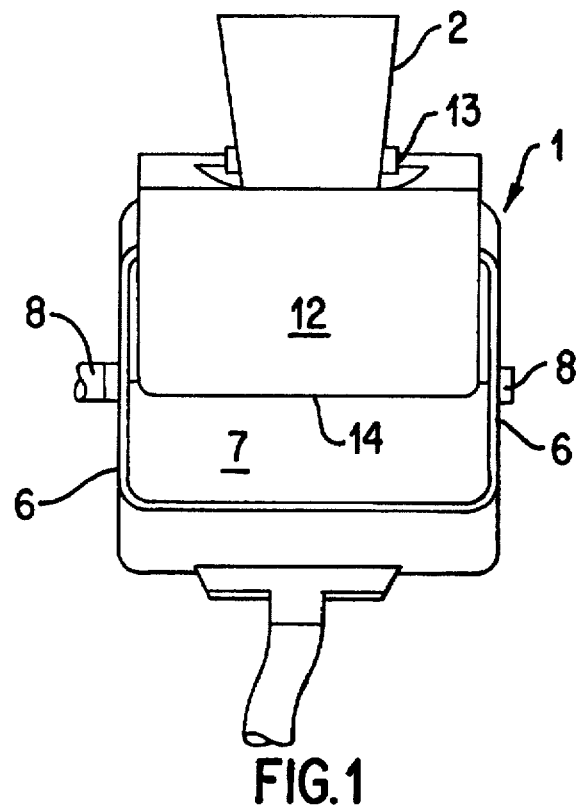
FIG. 1 is a side view of the device according to the invention.
Figure 2:
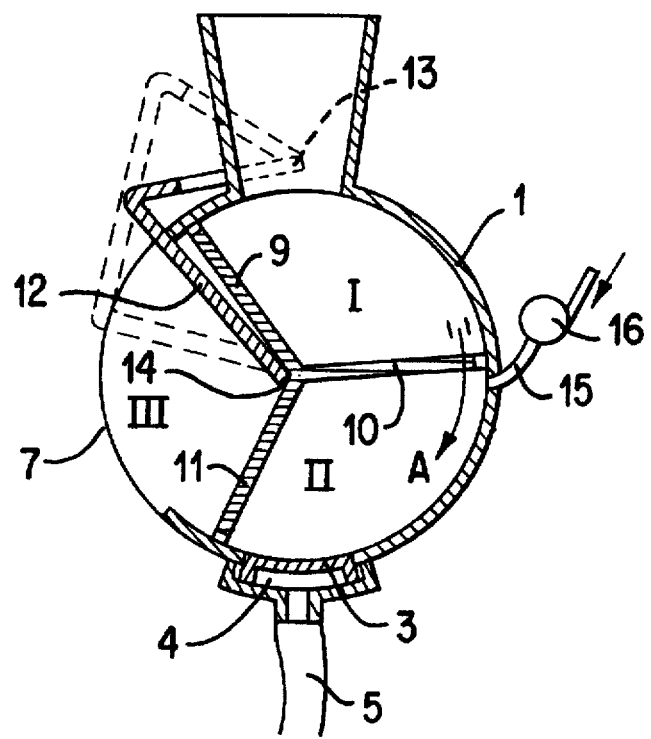
FIG. 2 is a cross-sectional view through the device of FIG. 1.

The device shown in FIG. 1 and 2 of the drawings comprises a substantially cylindrical, horizontally positioned container or housing 1 having at the upper side a metering hopper 2 for (hot) water and material to be extracted (for example coffee powder, tea and the like) and having at the lower side a filter 3 with a collecting trough 4 and a discharge conduit 5. The ends of the housing 1 are closed by end walls 6. A discharge opening 7 for dregs is provided laterally in the cylindrical circumferential wall, said opening extending along the entire axial length of the housing and covering an arc length of about 90° in the circumferential direction.

Three partitions 9, 10 and 11 are provided within the housing and extend from the axis of the housing radially outwardly in angular positions that are mutually spaced through 120°. The assembly of partitions 9, 10 and 11 is mounted for rotation in the housing 1; in the example shown it is rotatably supported with axle stubs 8 in the end walls 6. The radially outer longitudinal edges and the radially directed edges at the axial ends of the partitions are sealingly engaging the inner surface of the cylindrical circumferential wall and the inner side of the end walls 6 respectively.

Alternatively the partitions 9–11 may, together with the end walls 6, form a rotor that is journalled in an open ended housing 1. Such a rotor could be easily removed from the housing in the axial direction so as to facilitate cleaning of the device.

The partitions 9–11 divide the space within the housing 1 into a number of circumferentially spaced cells I, II and III. 12 designates a scraper blade that is pivotally mounted about a horizontal axis 13 and extends through the opening 7 into the cell that is located on the left side of the housing 1, with the scraper edge 14 of the scraper blade engaging the lower partition 11.

15 designates an air supply conduit, which is connected to an air pump 16 and discharges into the circumferential wall of the housing 1 on the right side (FIG. 2) at about axis level. The metering hopper 2, the filter 3 and the discharge opening 7 for dregs constitute three stations which are spread circumferentially of the housing 1. The discharge opening of the air supply conduit 15 is located in the transitional area between the "metering station" and the "filtering station".

The assembly of partitions 9–11 is rotated stepwise in the arrow direction a, e.g. by means of a time controlled stepping motor (not shown), whereby the cells I, II and III are successively moved to each of the said stations and kept stationary for a while at each of these stations.

The working of the device will be hereinafter explained with reference to FIG. 3A–3E and taking as an example the preparation of two cups of coffee.

Figure 3A:
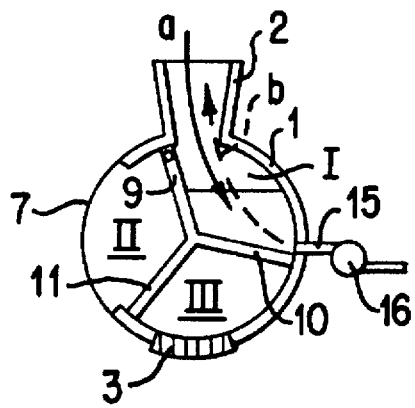
FIG. 3A–3E show five successive phases passed through by the device for preparing a plurality of drink units, for example cups of coffee.

FIG. 3A shows the partition assembly 9–11 in a position, in which cell I is connected with both the metering hopper 2 and the air supply conduit 15. While in this position, the device is put into operation, e.g. by depressing a (selector) button for two cups of coffee. The depression of such a button causes a time control circuit to be energized for an immediate activation of the metering devices for (hot) water and coffee powder (not shown), so that cell I is filled through the metering hopper 2 with the ingredients required for the first cup of coffee. Simultaneously or a few seconds later the air pump 16 is put into operation for the supply of air so as to agitate the (hot) water/coffee powder mixture and thereby promote the extracting process in cell I.

Thus FIG. 3A shows the device at the time at which the ingredients are supplied in the arrow directions a and b respectively to cell I. At the end of the required extracting time, which may be 6–10 seconds, energization of the stepping motor (not shown) is taking place, which causes the partition assembly 9–11 to be turned to the position shown in FIG. 3B. In this position the cell I has become connected with the filter 3, while the connection with the air supply conduit 15 is maintained for a short while. This causes the extract produced in cell I to be expelled (arrow c), while simultaneously the ingredients required for the second cup of coffee are supplied to cell II (arrow d).

Figure 3B:
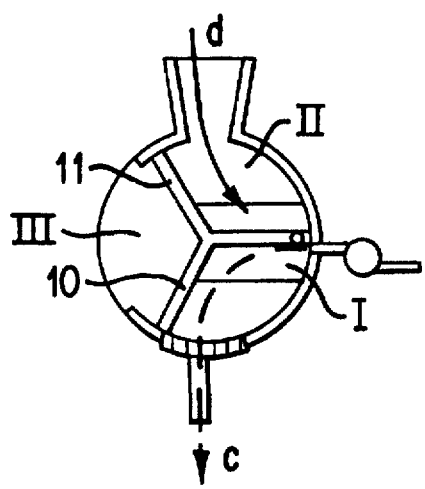
Figure 3C:
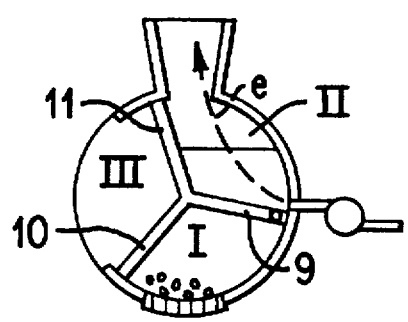

Well within the required extracting time for the mixture in cell II—after the extract has been expelled from cell I and delivered at the desired place under the pressure of the expelling air—the partition assembly 9–11 is turned through a small angle into the position shown in FIG. 3C, in which cell II has become connected with the air supply conduit 15 and air is introduced into cell II and passed through the mixture for agitation of the latter. At that time cell II is in the same position as cell I initially in FIG. 3A.

Figure 3D:
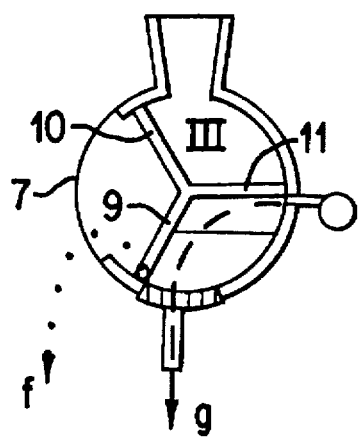

As soon as the total extracting time for the mixture in cell II has elapsed, the partition assembly 9–11 is turned from the position of FIG. 3C to that of FIG. 3D. During this rotary movement the dregs collected on the filter 3 in the positions of FIG. 3B and 3C are pushed by the partition 9 towards the discharge opening (arrow f). This rotary movement also brings cell II and the extract therein in connection with the filter 3, while the connection between cell II and the air supply conduit is maintained, which causes the extract to be expelled through the filter under increased pressure (arrow g). Thereupon the assembly of partitions 9–11 is turned into the position shown in FIG. 3E, in which the dregs collected on the filter 3 in the position of FIG. 3D are pushed by the partition 11 towards the opening 7 for discharge (arrow h). This has brought the assembly of partitions 9–11 back in the initial position of FIG. 3A, whereas the device has fulfilled the order of brewing two cups of coffee.

It will be understood that in the position of FIG. 3C cell III could be filled with ingredients for a third cup of coffee etc. This means that two cups of coffee have been prepared within one cycle, while within the same cycle the preparation of a third cup of coffee may start already.

Figure 3E:
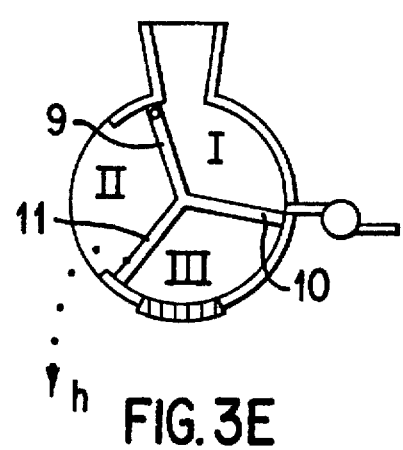

It is still to be remarked that when changing from the position of FIG. 3D to that of FIG. 3E dregs collected when changing from the position of FIG. 3C to that of FIG. 3D and keeping sticking to the front side of the partition 9, will be pushed outwardly through the discharge opening 7 by the scraper blade 12 that moves with its scraping edge 14 from the center outwardly across the partition 9. The scraper blade 12 is thereby moving from the position shown in full lines in FIG. 2 into the position indicated by dash lines.

It will be understood that the scraper blade after the clean scraped partition has passed in the direction of rotation, will fall back into its position shown in full lines but now with its operative scraping edge engaging the front side of the next partition, as seen in the direction of rotation.

Of course the invention is not limited to the example shown in the drawing.

A design on the basis of a vertically positioned container could also be realized. A lying position of the container, however, is to be preferred. To enlarge the capacity of a drinks machine equipped with the device according to the invention, two or more of such devices, if desired with use of selectively operable couplings, could be placed side by side and connected.

We claim:

1. A device for brewing coffee, tea or similar drinks, of the type comprising a substantially cylindrical container, an inlet for dry and liquid ingredients, a filter and an opening for discharging dregs collecting on said filter, said inlet, said filter and said opening being provided at three circumferentially spaced locations of the wall of said container, a rotor with three circumferentially spread cells being mounted within said container for a stepwise movement to each of said three circumferential spread locations, means being provided for expelling extract through said filter outwardly, said being constituted by a source of pressurized gas, a supply conduit from said source opening into the container wall at that side, along which the stepwise movement of the rotor is directed from the ingredients supply towards the filter, and at a location within a transitional area between a filling position, in which the ingredients are supplied, and a filtering position, in which the filtering of the extract is taking place.

2. A device according to claim 1, characterized in that the said three circumferentially spaced cells are mutually separated by axially and radially directed plate-like partitions.

3. A device according to claim 2, characterized by a scraper blade that extends obliquely from above through the dregs discharge opening into a cell between two partitions, the operative scraper edge of said blade engaging the forward face (i.e. the face directing in the direction of rotation of the partition assembly) of the lower one of the two partitions, said scraper blade being movably mounted in such a way that with a rotary movement of the partition assembly it is caused by the lower partition to swing, while sliding on said forward face, outwardly.

4. A device according to claim 3, characterized in that the scraper blade is swingably suspended at its end turned away from the operative scraper edge.

5. A device according to claim 4, characterized in that the scraper blade extends, from a swinging axis positioned adjacent the vertical midplane and above the container space, at first outwardly in a substantial horizontal direction and then obliquely downwardly and inwardly.

* * * * *